May 25, 1965 — M. S. BIRD — 3,185,133

ANIMAL CAGE FEEDING DEVICE

Filed Aug. 20, 1963

INVENTOR
MERRILL S. BIRD
BY Donald H. Zarley
ATTORNEY

United States Patent Office 3,185,133
Patented May 25, 1965

3,185,133
ANIMAL CAGE FEEDING DEVICE
Merrill S. Bird, 1218 44th St., Des Moines, Iowa
Filed Aug. 20, 1963, Ser. No. 303,363
6 Claims. (Cl. 119—18)

This invention relates to a device that is adapted for usage on the cages of small animals to facilitate the feeding thereof. The feeding operation of many small animals is extremely important in many cases. For example, the nutritional requirements for chinchillas must be carefully regulated because the nutrition of the animal has a direct relation to the quality of the fur produced. Such animals are ordinarily housed in a cage structure with a feeding compartment extending through the cage so that the animal can obtain feed from the inner part of the compartment and the operator can replenish the feed supply from the portion of the compartment outside the cage. This invention relates to a feeding device that is particularly adapted to a cage structure.

A principal object of this invention is to provide an animal cage feeding device wherein the operator will be able to visually determine at all times the quantity of feed in the feeding compartment.

A further object of this invention is to provide an animal cage feeding device that can be easily and quickly installed into the cage structure.

A still further object of this invention is to provide an animal cage feeding device that will prevent foreign material from entering the feed compartment.

A still further object of this invention is to provide an animal cage feeding device that can be easily cleaned.

A still further object of this invention is to provide an animal cage feeding device that is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawing, in which:

Figure 1:
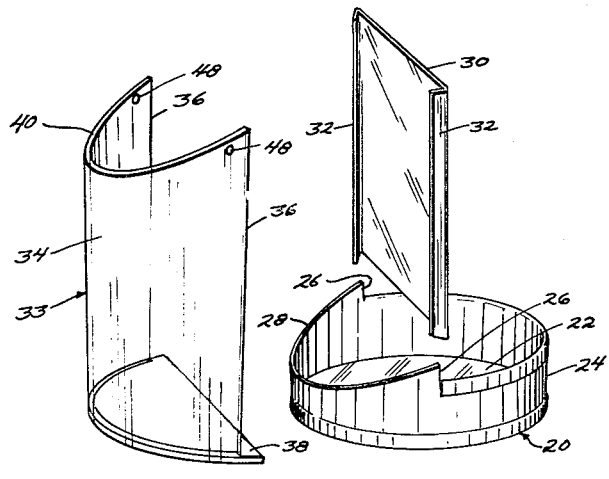
FIGURE 1 is a schematic perspective view of the components of this invention in their disassembled condition.
Figure 2:
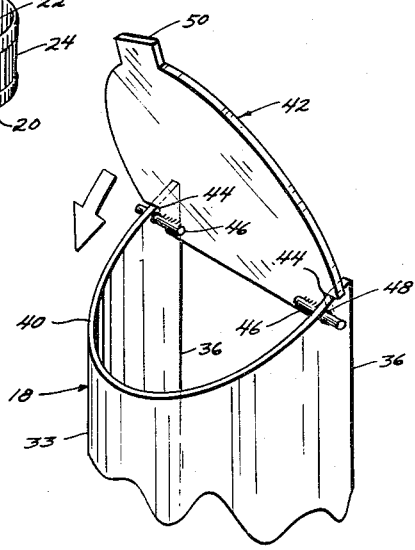
FIGURE 2 is a partial perspective view of the outer portion of the feed compartment which normally dwells on the exterior of the cage structure.
Figure 3:
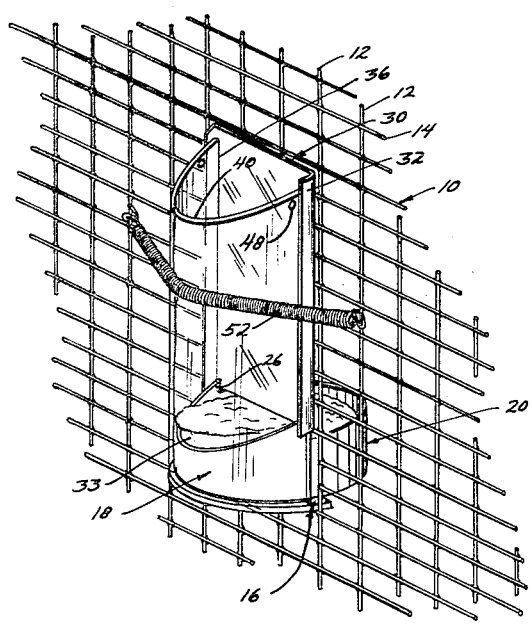
FIGURE 3 is a perspective view of the device of this invention mounted on a cage structure.

The numeral 10 generally designates a cage structure which is comprised of a plurality of spaced apart vertical wires 12 welded or otherwise secured to a plurality of spaced apart horizontal wires 14. A rectangular opening 16 is created in the cage 10 by severing a desired number of the horizontal and vertical wires.

A feed compartment 18 includes a horizontal cylindrical container 20 which is preferably comprised of metal material. Container 20 has a circular bottom 22 and a forward wall 24 of uniform height which extends upwardly around the front portion of the bottom 22. The forward wall 24 normally extends around more than 50 percent of the periphery of the bottom 22. Upwardly extending shoulders 26 appear at the extreme ends of the forward wall 24 and the rearward wall 28 extends rearwardly from the apex of the shoulders 26 to a progressively lower height at a point midway between the two shoulders. As will be pointed out hereafter, the forward vertical edges of the shoulders are adapted to function to prevent the animal from pulling the container 20 into the interior of the cage.

A rectangular metal plate 30 has flanges 32 on its vertical side edges, and the flanges are bent outwardly from the cage and inwardly towards the center of the plate. The width of the plate at its bottom edge is slightly greater than the distance between the two shoulders 26. A base compartment 33 has a vertical semi-circular transparent wall 34 which has forward vertical edges 36. The transparent wall 34 is mounted on a semi-circular bottom 38 by adhesive or the like. The forward edge of the bottom 38 extends slightly forwardly of the forward vertical edges 36 of the transparent wall. The top edge of the transparent wall 34 slopes downwardly and outwardly from the cage 10. A transparent lid 42 is semi-circular in shape and has notches cut therein at opposing points 44. Hinge pins 46 are secured in any convenient fashion to the lid 42 and extend outwardly in parallel and aligned relation into the void created by the notches 44. Apertures 48 appear in the transparent wall 34 just below the top edge 40 thereof at a point near the forward edges thereof. The lid 42 is secured to the wall 34 by yieldingly deflecting the wall so that the hinge pins 46 can be received in the apertures 48 in the wall. A tab 50 on the lower edge of the lid serves to facilitate its pivotal movement with respect to the wall. As will be described hereafter, a coil spring 52 is adapted to embrace the base compartment 33 and is adapted to have its ends hooked on the spaced apart vertical wires of the cage to hold the entire feeding compartment 18 in fixed relation with respect to the cage.

The normal operation of the device of this invention is as follows: The horizontal cylindrical container 20 is inserted into the base compartment 33 so that the vertical front edges of the shoulders 26 are in alignment with the vertical front edges 36 of the wall 34. The container 20 thereupon rests on top of the bottom 38 of the base compartment 33. The top portions of the forward edges 36 of the wall 34 are then slidably received within the grip of the flanges 32 of plate 30. In practice, the plate 30 is slidably moved downwardly on the wall 34 as the flanges 32 embrace the outer surface of the wall adjacent the forward edges 36. If the lid 42 is to be used, it will be installed in the manner described above.

After the above described components have been assembled, the forward portion of the container 20 is inserted into the rectangular opening 16 in the cage. One end of the spring 52 is thereupon detachably affixed to a vertical wire 12 of the cage. The spring is thereupon extended in a horizontal position around the upper portion of the wall 34 and the other end of the spring is thereupon affixed to a vertical wire 12.

After the device has been so installed in a cage structure, a predetermined amount of feed can be inserted into the top of the base compartment. The transparent characteristics of the wall 34 will permit the operator to always visually ascertain precisely how much feed is left in the container. The device is protected from the introduction of foreign material by use of the lid 42, and this is particularly desirable when a plurality of animal cages are stacked one upon another. The unit can be quickly and easily detached from the cage by reversing the above described steps and the components can be easily cleaned. It will be noted that the engagement of the shoulders 26 with the plate 30, and the subsequent engagement of the plate with the cage structure, will absolutely prevent an animal from pulling the container 20 into the interior of the cage.

Therefore, from the foregoing, it is seen that this invention will accomplish at least all of its stated objectives.

Some changes may be made in the construction and arrangement of my animal cage feeding device without departing from the real spirit and purpose of my invention, and it is my intention to cover by my claims, any modified forms of structure or use of mechanical equivalents which may be reasonably included within their scope.

I claim:
1. In combination,
a cage structure having a vertical wall means,
an access opening in said wall means,
a base compartment including a bottom portion with a vertical wall portion extending upwardly therefrom,
an access opening provided by said wall portion defined by vertical edges thereon,
a container resting on the bottom of said compartment and extending into said cage structure through said access opening,
the vertical edges of said wall portion being positioned adjacent the outside surface of said wall means,
a vertical plate having flanges on its side edges,
said plate being positioned in engagement with the outside surface of said cage structure with the flanges thereof gripping said wall portion adjacent the vertical edges thereof,
shoulders on the top of said container extending upwardly adjacent the outside surface of said wall means,
the lower side edges of said plate engaging said shoulders on said container.

2. The device of claim 1 wherein said container is cylindrical in shape and said base compartment is semi-circular in cross section.

3. The structure of claim 1 wherein said bottom portion protrudes outwardly beyond the vertical edges of said wall portion.

4. In combination,
a cage structure having a vertical wall means,
an access opening in said wall means,
a base compartment including a bottom portion with a vertical wall portion extending upwardly therefrom,
an access opening provided by said wall portion defined by vertical edges thereon,
a container resting on the bottom of said compartment and extending into said cage structure through said access opening,
the vertical edges of said wall portion being positioned adjacent the outside surface of said wall means,
a vertical plate having flanges on its side edges,
said plate being positioned in engagement with the outside surface of said cage structure with the flanges thereof gripping said wall portion adjacent the vertical edges thereof,
shoulders on the top of said container extending upwardly adjacent the outside surface of said wall means,
the lower side edges of said plate engaging said shoulders on said container,
and means for securing said base compartment to said cage structure.

5. The device of claim 1 wherein said base compartment is comprised of a transparent material.

6. In a feeding station,
a base compartment which is semi-circular in cross-section, and including a bottom portion with a vertical wall portion extending upwardly therefrom,
an access opening provided by said wall portion defined by vertical edges thereon,
a cylindrical container resting on the bottom of said compartment and adapted to extend into an access opening provided in a wall means of a cage structure,
the vertical edges of said wall portion being adapted to be positioned adjacent said wall means of said cage structure,
a vertical plate having flanges on its side edges, said flanges gripping said wall portion adjacent the vertical edges thereof,
shoulders on the top of said container extending upwardly therefrom,
the lower side edges of said plate engaging said shoulders on said container.

References Cited by the Examiner

UNITED STATES PATENTS

| 1,633,880 | 6/27 | Ahlrichs | 119—52 |
| 2,031,874 | 2/36 | Butler et al. | 119—18 |
| 2,728,496 | 12/55 | Sego. | |
| 2,943,600 | 7/60 | Rosoff | 119—18 |

FOREIGN PATENTS 685,482  1/53  Great Britain.

SAMUEL KOREN, *Primary Examiner.*

HUGH R. CHAMBLEE, *Examiner.*